(12) United States Patent
Spryshak et al.

(10) Patent No.: US 12,345,275 B2
(45) Date of Patent: Jul. 1, 2025

(54) BLOWER WHEEL ASSEMBLIES AND METHODS

(71) Applicant: Air International (US) Inc., Auburn Hills, MI (US)

(72) Inventors: Joseph J. Spryshak, Hartland, MI (US); Matthew Ackley, Harrison Township, MI (US)

(73) Assignee: AIR INTERNATIONAL (US) INC., Auburn Hills, MI (US)

( * ) Notice: Subject to any disclaimer, the term of this patent is extended or adjusted under 35 U.S.C. 154(b) by 0 days.

(21) Appl. No.: 18/597,343

(22) Filed: Mar. 6, 2024

(65) Prior Publication Data
US 2024/0376905 A1 Nov. 14, 2024

Related U.S. Application Data

(60) Provisional application No. 63/465,236, filed on May 9, 2023.

(51) Int. Cl.
*F04D 29/42* (2006.01)
*B60H 1/00* (2006.01)
*F04D 17/16* (2006.01)

(52) U.S. Cl.
CPC ..... *F04D 29/4226* (2013.01); *B60H 1/00028* (2013.01); *F04D 17/16* (2013.01)

(58) Field of Classification Search
CPC ... F04D 29/4226; F04D 29/4206; F04D 17/16
See application file for complete search history.

(56) References Cited

U.S. PATENT DOCUMENTS

| 7,883,312 | B2* | 2/2011 | Eguchi | F04D 29/665 |
| | | | | 415/206 |
| 9,086,073 | B2* | 7/2015 | Iyer | F04D 29/282 |
| 11,092,162 | B2* | 8/2021 | Ishii | F04D 29/2261 |

* cited by examiner

*Primary Examiner* — Michael L Sehn
(74) *Attorney, Agent, or Firm* — Carlson, Gaskey & Olds, P.C.

(57) ABSTRACT

An HVAC blower assembly includes a scroll housing, which includes an annular scroll channel provided by an outer ring wall and an inner ring wall extending from a scroll housing wall. A blower wheel is disposed within the scroll housing. The blower wheel includes an inlet end and an opposite end axially spaced from an inlet end with respect to an axis of rotation of the blower wheel. The blower wheel includes a plurality of circumferentially spaced blades, and a channel at the inlet end having a radially inner annular wall and a radially outer annular wall. A plurality of circumferentially spaced ribs are within the channel. The radially outer annular wall is radially between the outer ring wall and the inner ring wall, and the inner ring wall is radially between the radially inner annular wall and the radially outer annular wall.

20 Claims, 9 Drawing Sheets

BLOWER WHEEL ASSEMBLIES AND METHODS

CROSS-REFERENCED TO RELATED APPLICATION

This application claims priority to U.S. Provisional Application No. 63/465,236, which was filed May 9, 2023.

BACKGROUND

Vehicles may have a HVAC (Heating, ventilation, and air conditioning) climate control system located within an instrument panel which provides conditioned air, such as by heating or cooling or dehumidifying, through various outlets to occupants in the vehicle cabin.

These HVAC systems may include centrifugal blowers. The blowers may generally include a blower wheel that rotates within a housing and is driven by an electric motor. The blower wheel has blades that draw air in axially along the blower wheel's axis of rotation, and discharge air radially outwardly. Blowers may be used in a variety of applications, such as in heating and cooling systems, including in vehicle applications, such as to introduce indoor and/or outdoor air to the HVAC system, the air passing the air through the system and blowing conditioned air into the interior of the automobile.

SUMMARY

An HVAC blower assembly according to an example of this disclosure includes a scroll housing, which includes an annular scroll channel provided by an outer ring wall and an inner ring wall extending from a scroll housing wall. A blower wheel is disposed within the scroll housing. The blower wheel includes an inlet end and an opposite end axially spaced from an inlet end with respect to an axis of rotation of the blower wheel. The blower wheel includes a plurality of circumferentially spaced blades, and a channel at the inlet end having a radially inner annular wall and a radially outer annular wall. A plurality of circumferentially spaced ribs are within the channel. The radially outer annular wall is radially between the outer ring wall and the inner ring wall, and the inner ring wall is radially between the radially inner annular wall and the radially outer annular wall.

In a further example of the foregoing, the plurality of circumferentially spaced blades are circumferentially aligned with the plurality of circumferentially spaced ribs, and one or more of the circumferentially spaced blades includes a tapered portion radially opposite the channel from the plurality of ribs, the length from the leading edge to the trailing edge tapering at the tapered portion.

In a further example of any of the foregoing, the plurality of circumferentially spaced blades and the plurality of circumferentially spaced ribs are equal in number.

In a further example of any of the foregoing, the outer ring wall extends a first axial height from the scroll housing wall, the inner ring wall extends a second axial height from the scroll housing wall. The first axial height is greater than the second axial height, and the scroll housing provides an inlet opening radially inward of the inner ring wall and the outer ring wall.

In a further example of any of the foregoing, axial ends of the radially inner annular wall and the radially outer annular wall lie in a plane, and the inner ring wall extends through the plane.

In a further example of any of the foregoing, the radially inner wall is curved and forms a concave surface extending from the radially outer wall.

In a further example of any of the foregoing, axial ends of the radially inner annular wall and the radially outer annular wall lie in a plane, and the inner ring wall extends through the plane.

In a further example of any of the foregoing, the plurality of circumferentially spaced ribs is curved.

In a further example of any of the foregoing, the radially inner wall is curved and forms a concave surface extending from the radially outer wall.

In a further example of any of the foregoing, one or more of the plurality of circumferentially spaced ribs is curved.

In a further example of any of the foregoing, the plurality of circumferentially spaced blades are circumferentially aligned with the plurality of circumferentially spaced ribs.

In a further example of any of the foregoing, the plurality of circumferentially spaced blades and the plurality of circumferentially spaced ribs are equal in number.

In a further example of any of the foregoing, the outer ring wall extends a first axial height from the scroll housing wall, the inner ring wall extends a second axial height from the scroll housing wall, and the first axial height is greater than the second axial height.

In a further example of any of the foregoing, axial ends of the radially inner annular wall and the radially outer annular wall lie in a plane, and the inner ring wall extends through the plane.

In a further example of any of the foregoing, the inner ring wall and the outer ring wall are fully annular.

In a further example of any of the foregoing, axial ends of the radially inner annular wall and the radially outer annular wall lie in a plane, and the inner ring wall extends through the plane, and the inner ring wall is fully annular.

In a further example of any of the foregoing, the outer ring wall is fully annular. The outer ring wall extends a first axial height from the scroll housing wall. The inner ring wall extends a second axial height from the scroll housing wall. The first axial height is greater than the second axial height, and the scroll housing provides an inlet opening radially inward of the inner ring wall and the outer ring wall.

In a further example of any of the foregoing, the radially inner wall is curved and forms a concave surface extending from the radially outer wall.

In a further example of any of the foregoing, the scroll housing provides a scroll cavity, and the blower wheel is configured to draw air in axially and discharge air radially outwardly into the scroll cavity.

In a further example of any of the foregoing, the scroll housing provides an inlet opening radially inward of the inner ring wall and the outer ring wall.

These and other features may be best understood from the following specification and drawings, the following of which is a brief description.

DETAILED DESCRIPTION

This disclosure is related to HVAC systems, and more particularly to blower wheel and scroll housing arrangements.

Figure 1:
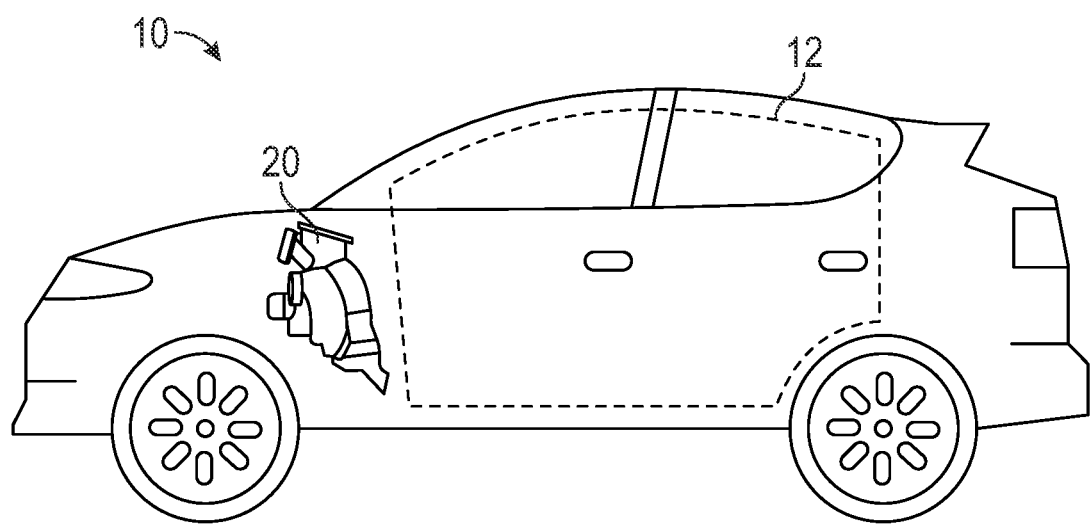
FIG. 1 schematically illustrates a vehicle with an example HVAC system.

FIG. 1 illustrates a vehicle 10 including an example HVAC system 20 for providing conditioned air to a vehicle cabin 12. In some examples, the vehicle 10 may include any of automobiles, heavy trucks, agricultural vehicles, or commercial vehicles.

Figure 2:
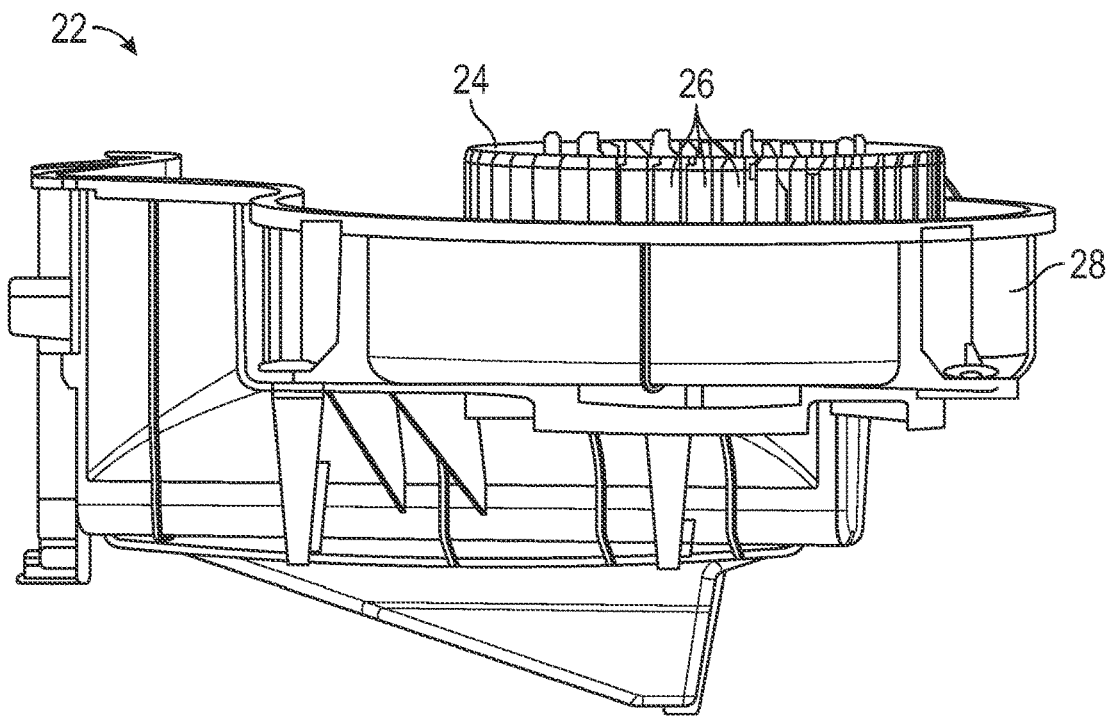
FIG. 2 illustrates an example blower assembly.
Figure 10:
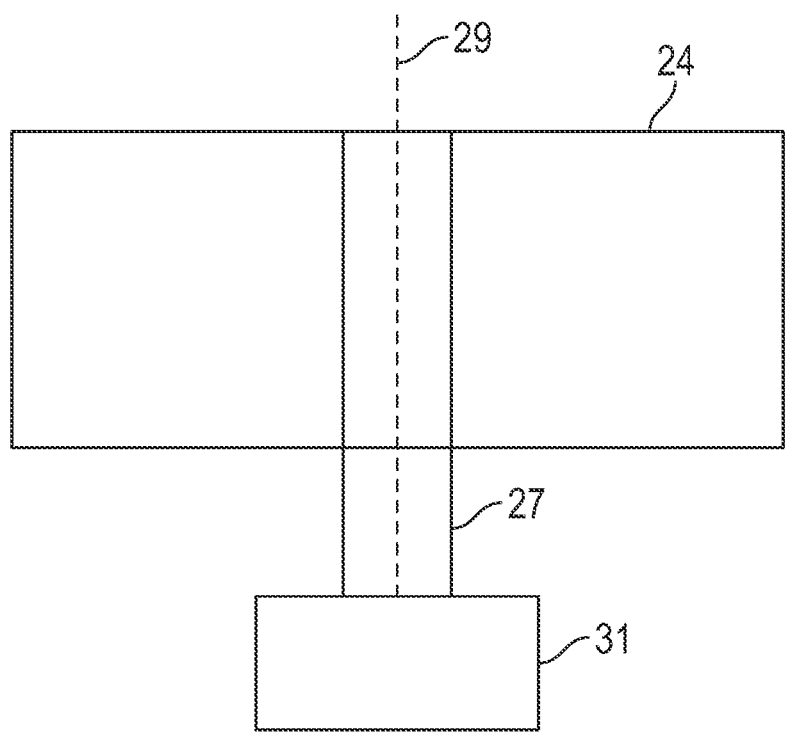
FIG. 10 schematically illustrates the example blower assembly.

FIG. 2 illustrates an example blower assembly 22, which may be used in the HVAC system 20 of FIG. 1, for example. The example blower assembly 22 includes a blower wheel 24 including a plurality of blades 26 that draw air in axially and discharge air radially outwardly. The blower wheel 24 rotates within a scroll housing 28. The blower wheel 24 may be connected to a blower shaft 27 driven by a blower motor 31 (shown schematically in FIG. 10) to blow or force air through the HVAC system 20, allowing for heating, cooling, and/or ventilation.

Figure 3:
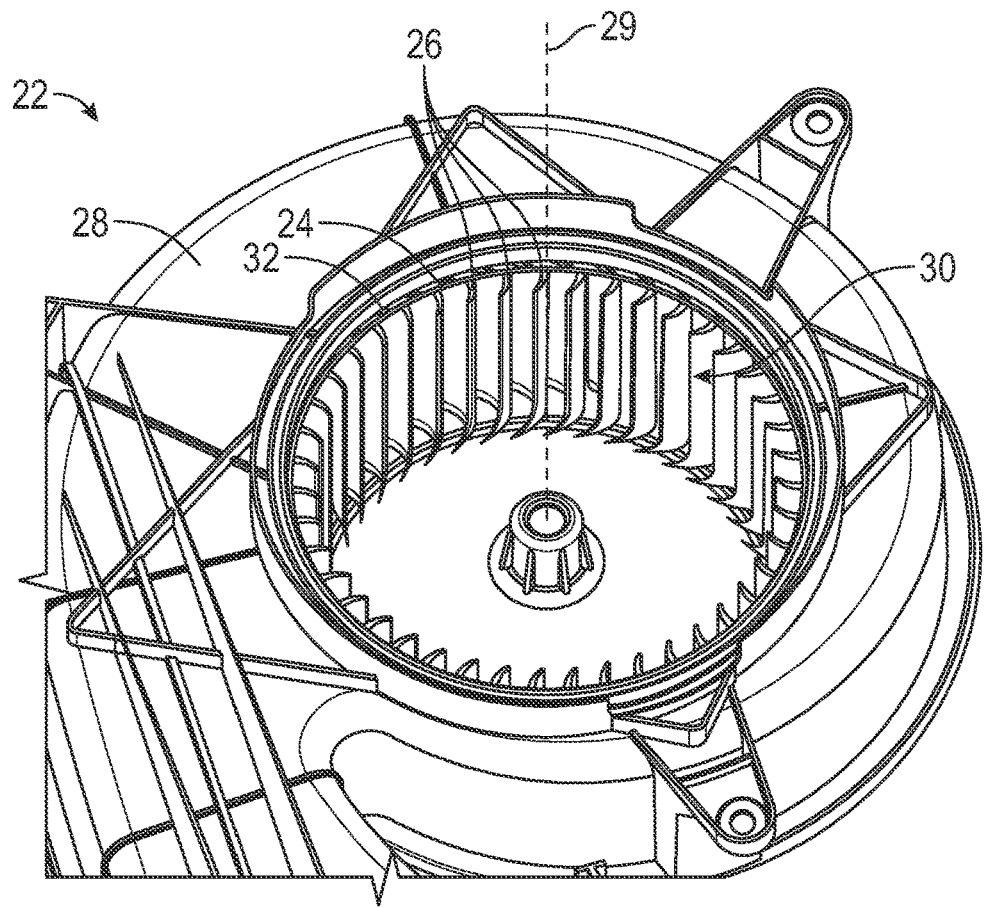
FIG. 3 illustrates the example blower assembly.

FIG. 3 illustrates the blower assembly 22 at the inlet end 30 of the blower wheel 24. The example blower wheel 24 draws air in axially through the opening 32 in the scroll housing 28 and discharges air radially outwardly into the scroll housing 28 with respect to the axis of rotation 29 of the blower wheel 24.

Figure 4:
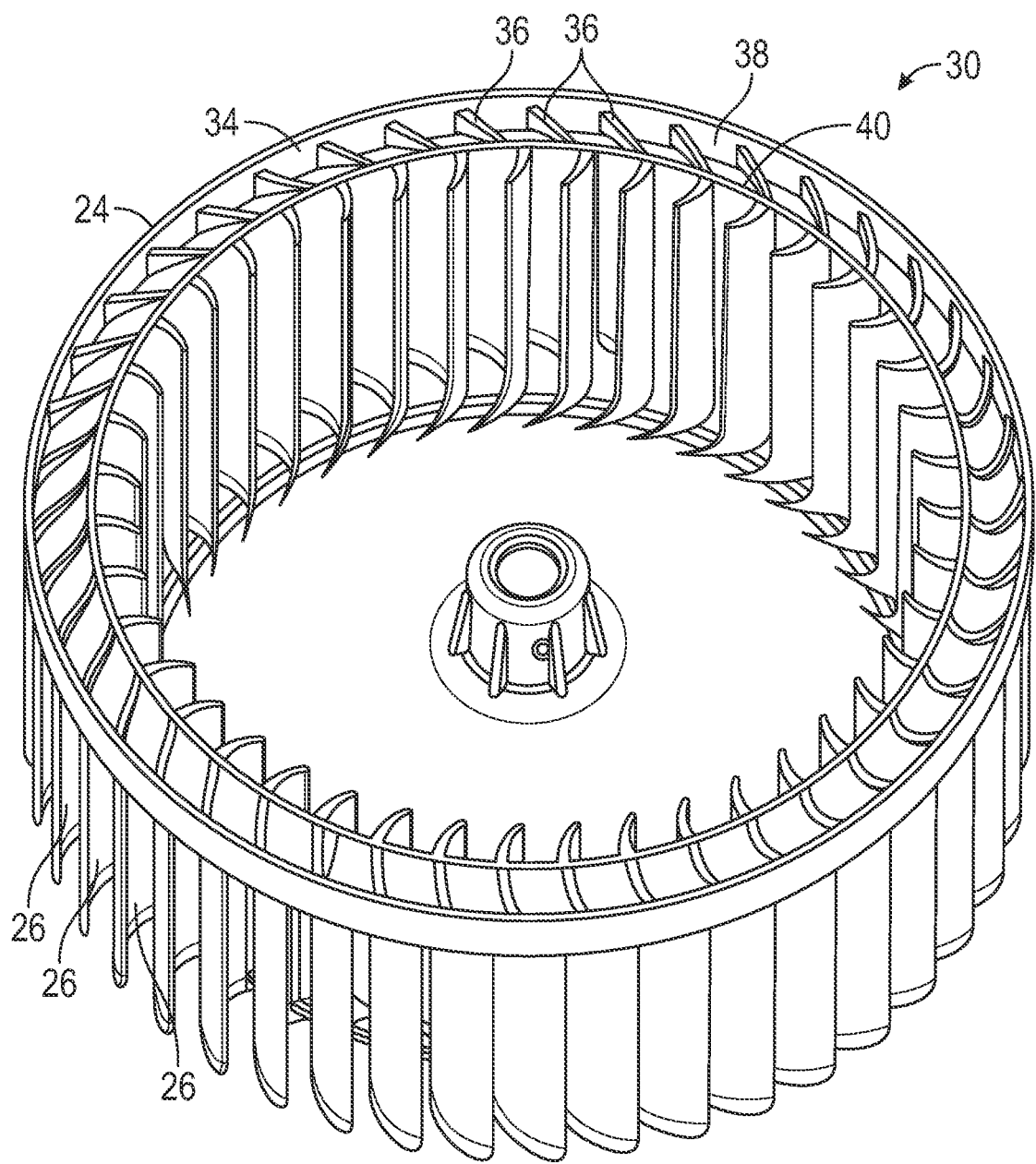
FIG. 4 illustrates an example blower wheel.
Figure 8:
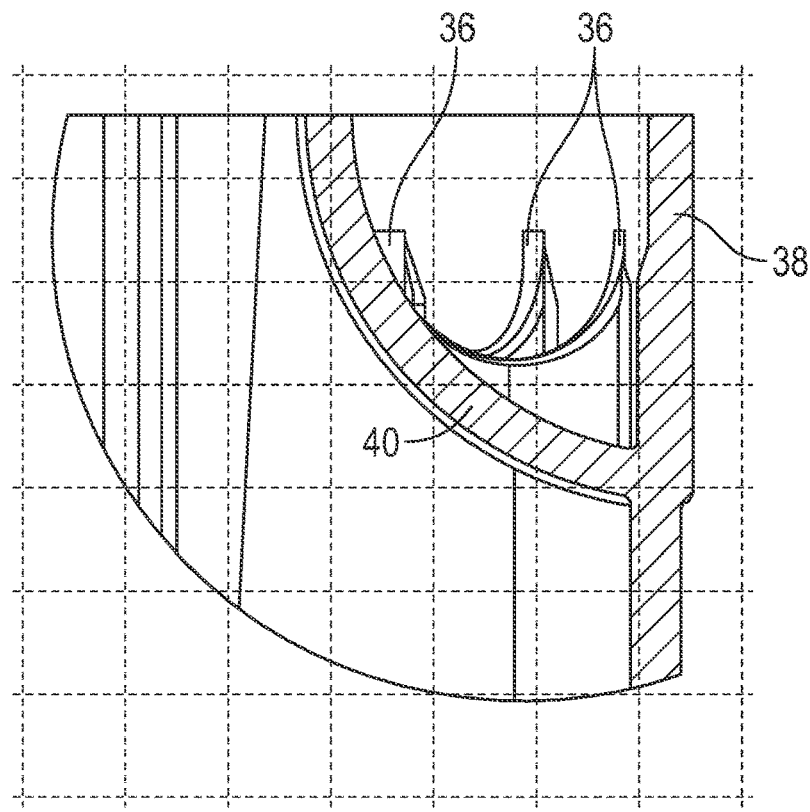
FIG. 8 illustrates a sectional view of the example blower wheel.
Figure 9:
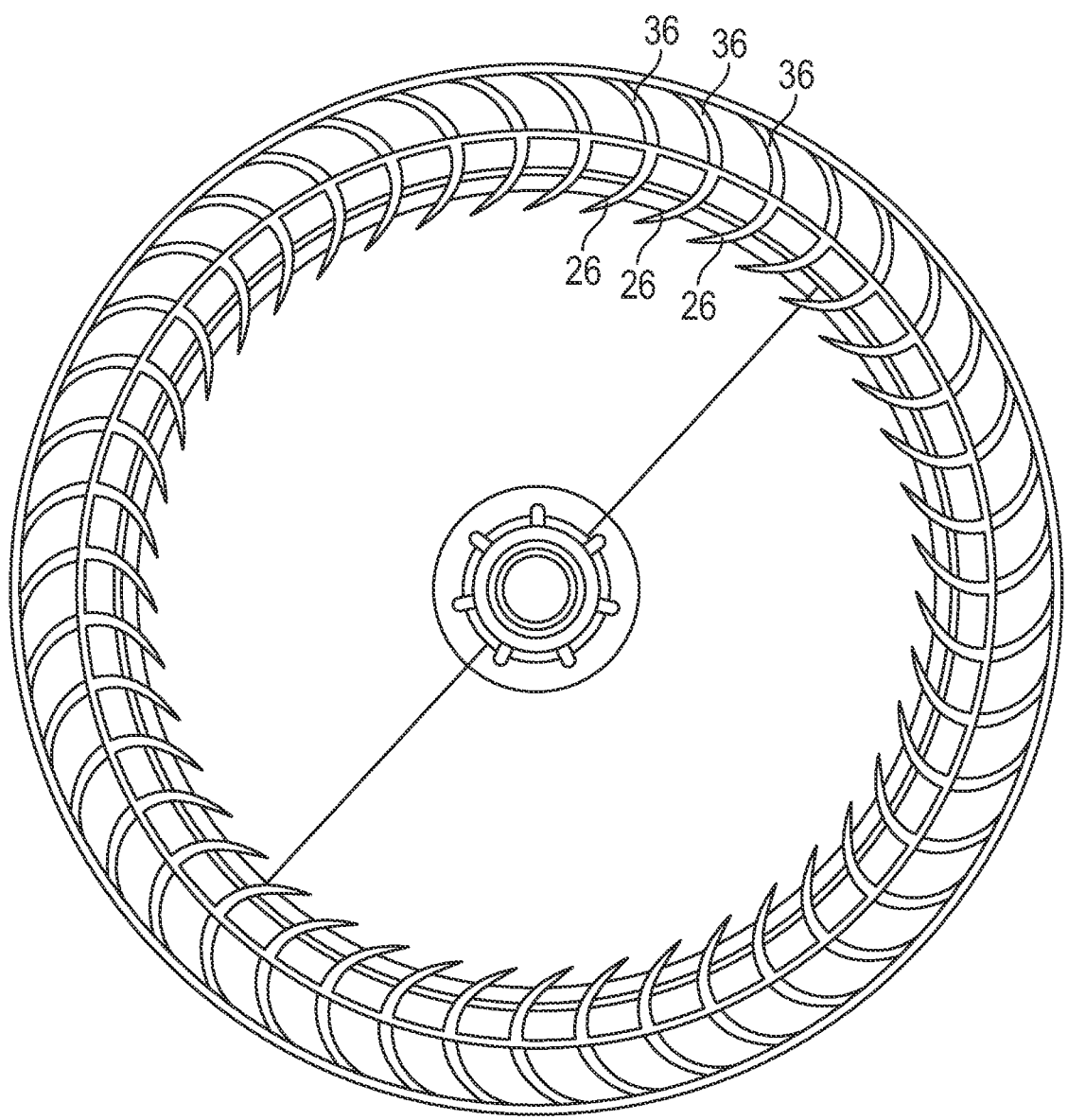
FIG. 9 illustrates an end view of the example blower wheel.

FIG. 4 illustrates the example blower wheel 24 including a wheel channel 34 at its inlet end 30. The wheel channel 34 extends circumferentially about the circumference of the blower wheel 24, bound radially by a radially outer annular wall 38 and a radially inner annular wall 40. A plurality of ribs 36 are provided within the channel 34 extending radially from the wall 38 to the wall 40 (see also FIG. 8). In some examples, as shown, an equal number of ribs 36 and blades 26 are provided (see also FIG. 9). In some examples, as shown, the ribs 36 are circumferentially aligned with the blades 26. In some examples, as shown, the ribs 36 are curved.

Figure 5:
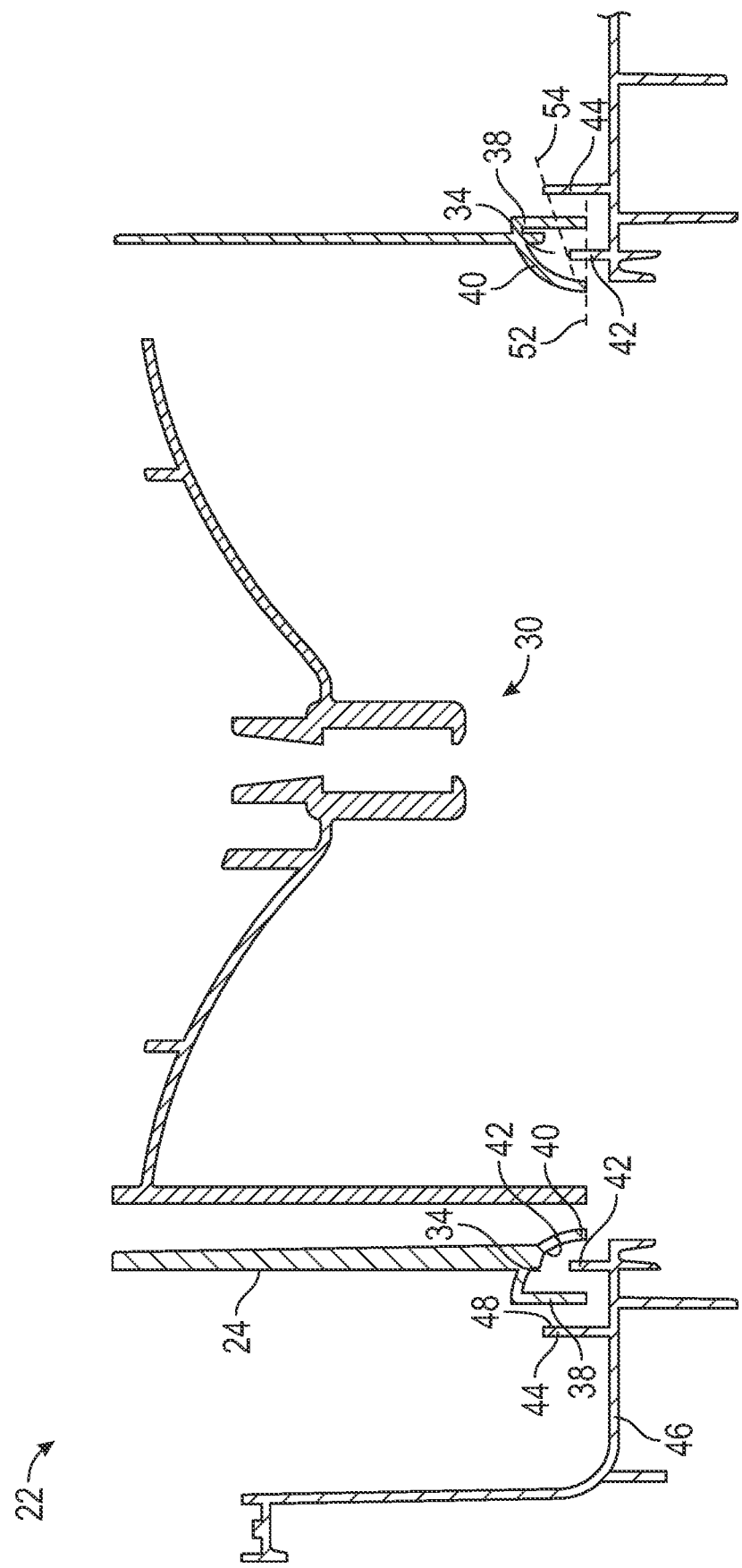
FIG. 5 illustrates a cross sectional view of the example blower assembly.

FIG. 5 illustrates a cross-sectional view of a portion of the example blower assembly 22. The wheel channel 34 is provided by a radially outer wall 38 and an inner wall 40 extending radially inward from the radially outer wall 38 as it extends axially toward the inlet end 30 of the blower wheel 24. The example inner wall 40 is curved and forms a concave surface extending from the wall 38 that partially bounds the channel. In some examples, the inner wall is straight or partially straight in the substantially axial direction with respect to the cross-section shown.

An inner ring wall 42 and an outer ring wall 44 extend from a scroll housing wall 46 to form a circumferentially extending scroll channel 48. The radially outer wall 38 of the wheel channel 34 extends axially into the scroll channel 48. The inner ring wall 42 extends axially into the wheel channel 34. In some examples, as shown, the axial ends of the walls 38, 40 lie in a plane 52 and the inner ring wall 42 extends axially beyond the plane 52 and into the channel 34. In some examples, as shown, a line 54 extends through the ends of the ring walls 42, 44, and the wall 38 is transverse to the line 54 in the cross section shown. The example outer ring wall 44 extends an axial height from the wall 46 that is greater than the axial height of the inner ring wall 42 from the wall 46. The example ring walls 42, 44 are fully annular, i.e., they extend full circumferences. In some examples, as shown, the example ring walls 42, 44 extend from a portion of the wall 46 that is substantially parallel (±15 degrees) to the plant 52. One or more of the configurations described create a tortuous leak path F2, as shown in FIG. 6.

The example walls 38, 40 rotate with the blower wheel 24, and the ring walls 42, 44 remain stationary with the fixed scroll housing 28.

Figure 6:
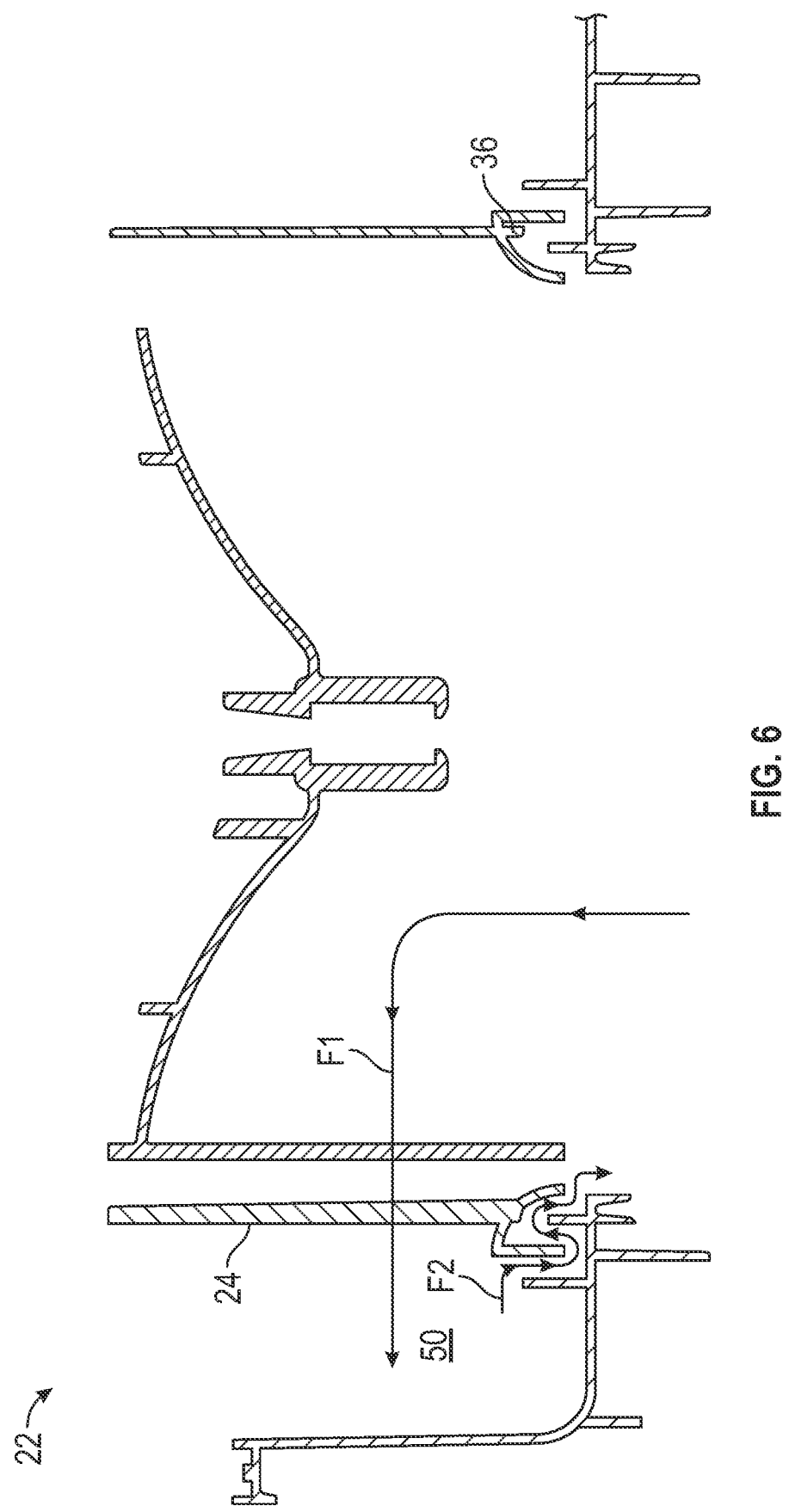
FIG. 6 schematically illustrates flow paths through a cross sectional view of the example blower assembly.

FIG. 6 schematically illustrates flow in a cross-sectional view of a portion of the example blower assembly 22. The example blower wheel 24 draws air in axially and discharges air radially outwardly to the scroll cavity 50, as shown schematically as the flow F1. The example blower wheel 24 and scroll housing 28 arrangement prevents leakage from the scroll cavity 50 by providing a tortuous leak path F2 through the channels 34, 48, resulting in increased efficiency and decreased noise of the blower assembly 22. The ribs 36 within the wheel channel 34 act as blades moving air through the channel 34, creating a further sealing effect of the leak path.

Figure 7:
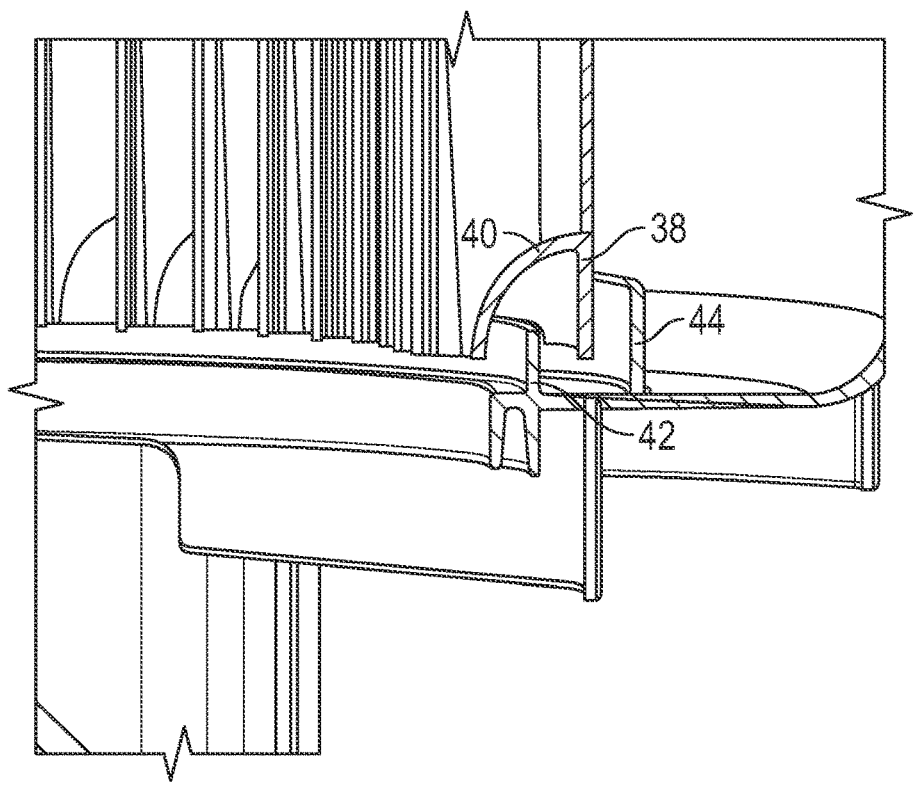
FIG. 7 illustrates a sectional view of the example blower assembly.

FIG. 7 illustrates a sectional view of the example blower wheel 24 and scroll housing 28, showing the relationship between the example walls 38, 40 and ring walls 42, 44.

Figure 11:
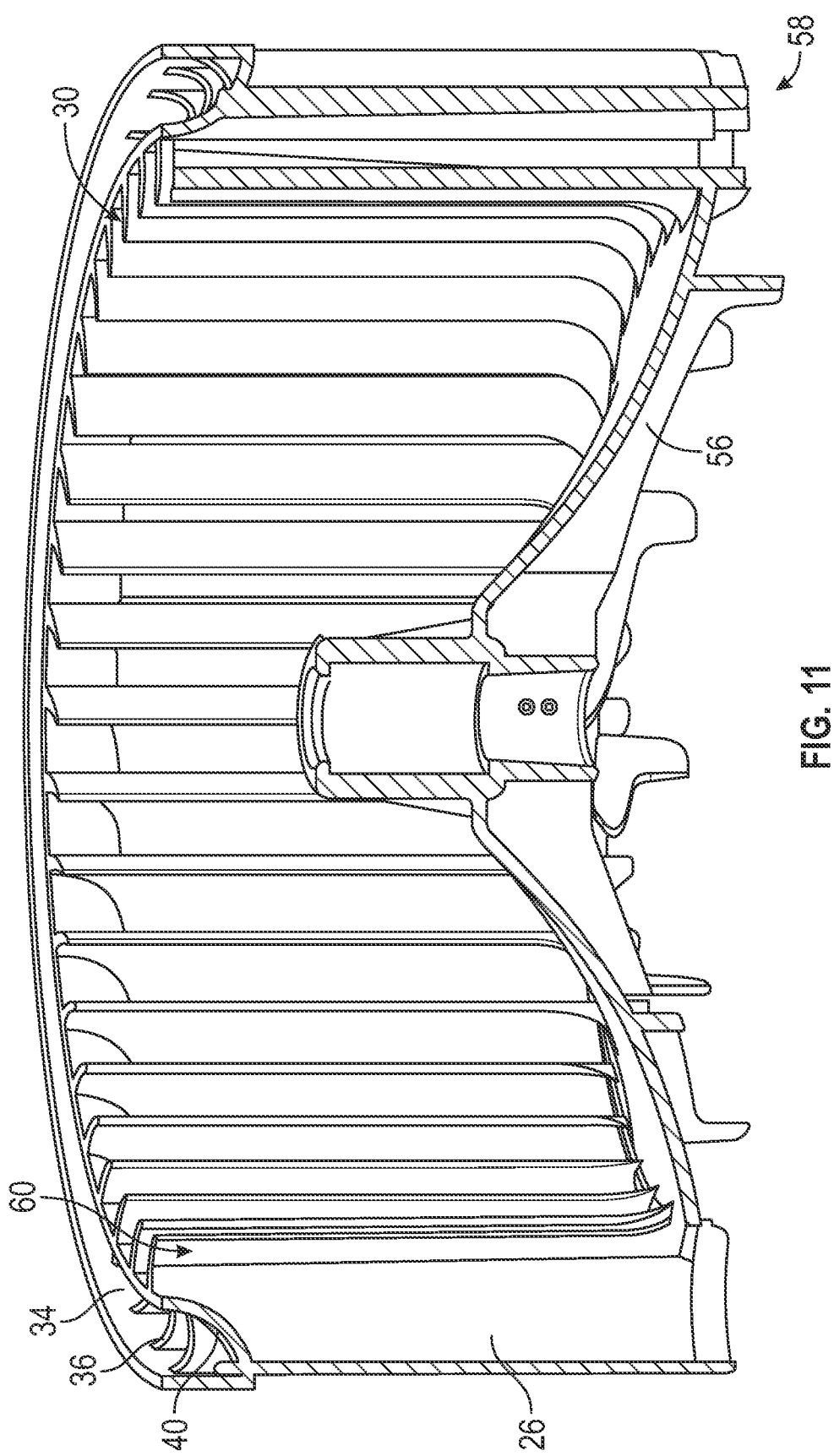
FIG. 11 illustrates a cross sectional view of the example blower wheel.

As illustrated in FIG. 11, the blades 26 abut the wall 40 at a radially opposite side of the wall 40 from the channel 34. In some examples, as shown, the length from the leading edge to the trailing edge of one or more of the blades 26 tapers at the inlet end to accommodate the wall 40 and channel 34. In some examples, as shown, the tapered portion 60 of the blade 26 extends to the inlet end, radially inward of the channel 34. These portions 60 extend axially farther to the inlet end 30 than the ribs 36. The tapered portions 60 may taper in a curved fashion to complement the curvature of the wall 40. A shaft engagement portion 56 may be positioned near the end 58 axially opposite the blower 24 from the inlet end 30 as shown.

An HVAC blower assembly may include a scroll housing including an annular scroll channel provided by an outer ring wall and an inner ring wall extending from a scroll housing wall. A blower wheel is within the scroll housing. The blower wheel includes an inlet end and an opposite end axially spaced from an inlet end with respect to an axis of rotation of the blower wheel. The blower wheel further includes a plurality of circumferentially spaced blades. A channel at the inlet end includes a radially inner annular wall and a radially outer annular wall. A plurality of circumferentially spaced ribs are within the channel. The radially outer annular wall is radially between the outer ring wall and the inner ring wall. The inner ring wall is radially between the radially inner annular wall and the radially outer annular wall.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An HVAC blower assembly comprising:
a scroll housing including an annular scroll channel provided by an outer ring wall and an inner ring wall extending from a scroll housing wall; and
a blower wheel disposed within the scroll housing, the blower wheel comprising:
an inlet end and an opposite end axially spaced from the inlet end with respect to an axis of rotation of the blower wheel;
a plurality of circumferentially spaced blades;
a wheel channel at the inlet end provided between a radially inner annular wall extending radially inward from a radially outer annular wall as the radially inner annular wall extends axially toward the inlet end; and
a plurality of circumferentially spaced ribs disposed within the wheel channel, wherein the radially outer annular wall is radially between the outer ring wall and the inner ring wall, and the inner ring wall is radially between the radially inner annular wall and the radially outer annular wall.

2. The assembly of claim 1, wherein the plurality of circumferentially spaced blades are circumferentially aligned with the plurality of circumferentially spaced ribs, and each of the circumferentially spaced blades includes a tapered portion radially opposite the wheel channel from the plurality of ribs, a length from a leading edge to a trailing edge tapering at the tapered portion.

3. The assembly of claim 2, wherein the plurality of circumferentially spaced blades and the plurality of circumferentially spaced ribs are equal in number.

4. The assembly of claim 1, wherein the outer ring wall extends a first axial height from the scroll housing wall, the inner ring wall extends a second axial height from the scroll housing wall, the first axial height is greater than the second axial height, and the scroll housing provides an inlet opening radially inward of the inner ring wall and the outer ring wall.

5. The assembly of claim 4, wherein axial ends of the radially inner annular wall and the radially outer annular wall lie in a plane, and the inner ring wall extends through the plane.

6. The assembly of claim 5, wherein the radially inner wall is curved and forms a concave surface extending from the radially outer wall.

7. The assembly of claim 1, wherein axial ends of the radially inner annular wall and the radially outer annular wall lie in a plane, and the inner ring wall extends through the plane.

8. The assembly of claim 1, wherein each of the plurality of circumferentially spaced ribs is curved.

9. The assembly of claim 1, wherein the radially inner wall is curved and forms a concave surface extending from the radially outer wall.

10. The assembly of claim 1, wherein each of the plurality of circumferentially spaced ribs is curved, the plurality of circumferentially spaced blades are circumferentially aligned with the plurality of circumferentially spaced ribs, and the plurality of circumferentially spaced blades and the plurality of circumferentially spaced ribs are equal in number, and each of the circumferentially spaced blades includes a tapered portion radially opposite the wheel channel from the plurality of ribs, a length from a leading edge to a trailing edge tapering at the tapered portion.

11. The assembly of claim 10, wherein the outer ring wall extends a first axial height from the scroll housing wall, the inner ring wall extends a second axial height from the scroll housing wall, and the first axial height is greater than the second axial height.

12. The assembly of claim 11, wherein axial ends of the radially inner annular wall and the radially outer annular wall lie in a plane, and the inner ring wall extends through the plane.

13. The assembly of claim 1, wherein the inner ring wall and the outer ring wall are fully annular.

14. The assembly of claim 1, wherein axial ends of the radially inner annular wall and the radially outer annular wall lie in a plane, and the inner ring wall extends through the plane, and the inner ring wall is fully annular.

15. The assembly of claim 14, wherein the outer ring wall is fully annular, the outer ring wall extends a first axial height from the scroll housing wall, the inner ring wall extends a second axial height from the scroll housing wall, the first axial height is greater than the second axial height, and the scroll housing provides an inlet opening radially inward of the inner ring wall and the outer ring wall.

16. The assembly of claim 15, wherein the radially inner wall is curved and forms a concave surface extending from the radially outer wall.

17. The assembly of claim 1, wherein the scroll housing provides a scroll cavity, and the blower wheel is configured to draw air in axially and discharge air radially outwardly into the scroll cavity.

18. The assembly of claim 1, wherein the scroll housing provides an inlet opening radially inward of the inner ring wall and the outer ring wall.

19. An HVAC assembly comprising:
a scroll housing including an annular scroll channel provided by an outer ring wall and an inner ring wall extending from a scroll housing wall; and
a blower wheel comprising:
an inlet end and an opposite end axially spaced from the inlet end with respect to an axis of rotation of the blower wheel;
a plurality of circumferentially spaced blades;
a wheel channel at the inlet end provided between a radially inner annular wall extending radially inward from a radially outer annular wall as the radially inner annular wall extends axially toward the inlet end; and
a plurality of circumferentially spaced ribs disposed within the wheel channel and extending axially toward the inlet end from the radially inner annular wall, wherein the radially outer annular wall is radially between the outer ring wall and the inner ring wall, and the inner ring wall is radially between the radially inner annular wall and the radially outer annular wall.

20. An HVAC assembly comprising:
a scroll housing including an annular scroll channel provided by an outer ring wall and an inner ring wall extending from a scroll housing wall; and
a blower wheel comprising:
an inlet end and an opposite end axially spaced from the inlet end with respect to an axis of rotation of the blower wheel;
a plurality of circumferentially spaced blades;
a wheel channel at the inlet end provided between a radially inner annular wall extending radially inward from a radially outer annular wall as the radially inner annular wall extends axially toward the inlet end; and a plurality of circumferentially spaced ribs disposed within the wheel channel disposed opposite the radially inner annular wall from the plurality of circumferentially spaced blades, wherein the radially outer annular wall is radially between the outer ring wall and the inner ring wall, and the inner ring wall is radially between the radially inner annular wall and the radially outer annular wall.

\* \* \* \* \*